(12) United States Patent
Hankins et al.

(10) Patent No.: US 8,689,215 B2
(45) Date of Patent: Apr. 1, 2014

(54) STRUCTURED EXCEPTION HANDLING FOR APPLICATION-MANAGED THREAD UNITS

(75) Inventors: Richard A. Hankins, San Jose, CA (US); Gautham N. Chinya, Hillsboro, OR (US); Hong Wang, Fremont, CA (US); David K. Poulsen, Champaign, IL (US); Shirish Aundhe, Beaverton, OR (US); Baiju V. Patel, Portland, OR (US); Sanjiv M. Shah, Champaign, IL (US)

(73) Assignee: Intel Corporation, Santa Clara, CA (US)

( * ) Notice: Subject to any disclaimer, the term of this patent is extended or adjusted under 35 U.S.C. 154(b) by 1493 days.

(21) Appl. No.: 11/642,384

(22) Filed: Dec. 19, 2006

(65) Prior Publication Data

US 2008/0148259 A1    Jun. 19, 2008

(51) Int. Cl.
G06F 9/46    (2006.01)

(52) U.S. Cl.
USPC .......................................... 718/100; 712/244

(58) Field of Classification Search
None
See application file for complete search history.

(56) References Cited

U.S. PATENT DOCUMENTS

| | | | |
|---|---|---|---|
| 5,305,455 A * | 4/1994 | Anschuetz et al. | 718/100 |
| 5,432,795 A * | 7/1995 | Robinson | 717/125 |
| 6,006,320 A * | 12/1999 | Parady | 712/36 |
| 6,047,307 A * | 4/2000 | Radko | 718/100 |
| 6,289,369 B1 * | 9/2001 | Sundaresan | 718/103 |
| 6,708,194 B1 * | 3/2004 | Korn | 718/100 |
| 6,871,173 B1 * | 3/2005 | Brauch | 703/26 |
| 6,895,583 B1 * | 5/2005 | Koning | 718/100 |
| 7,383,587 B2 * | 6/2008 | Watt et al. | 726/30 |
| 7,730,291 B2 * | 6/2010 | Kissell | 712/244 |
| 7,768,518 B2 * | 8/2010 | Collins et al. | 345/505 |
| 7,849,465 B2 | 12/2010 | Zou | |
| 7,913,226 B2 * | 3/2011 | Lowell et al. | 717/120 |
| 8,028,295 B2 * | 9/2011 | Chinya et al. | 718/108 |
| 8,074,060 B2 * | 12/2011 | Col et al. | 712/244 |
| 8,516,483 B2 * | 8/2013 | Chinya et al. | 718/100 |
| 2005/0149711 A1 * | 7/2005 | Zimmer et al. | 712/244 |
| 2005/0223199 A1 * | 10/2005 | Grochowski et al. | 712/235 |
| 2006/0150183 A1 * | 7/2006 | Chinya et al. | 718/100 |
| 2006/0150184 A1 | 7/2006 | Hankins et al. | |
| 2006/0271932 A1 * | 11/2006 | Chinya et al. | 718/100 |
| 2007/0006231 A1 | 1/2007 | Wang | |
| 2007/0150900 A1 | 6/2007 | Hankins et al. | |
| 2008/0005546 A1 * | 1/2008 | Wang et al. | 712/244 |
| 2008/0077909 A1 * | 3/2008 | Collins et al. | 717/104 |
| 2008/0163366 A1 * | 7/2008 | Chinya et al. | 726/21 |

OTHER PUBLICATIONS

Thekkath et al. "Hardware and Software Support for Efficient Exception Handling", Jul. 17, 1994.*

(Continued)

*Primary Examiner* — Emerson Puente
*Assistant Examiner* — Hiren Patel
(74) *Attorney, Agent, or Firm* — Grossman, Tucker, Perreault & Pfleger, PLLC

(57) ABSTRACT

Methods, data structures, instructions, and techniques for structured exception handling for user-level threads in a multi-threading system are provided. Registered filter routines may be dispatched to a thread unit not managed by the operating system (OS). The dispatch may occur by allowing an OS-managed thread unit (proxy) to invoke the OS-provided structured exception handling service (including dispatcher) on behalf of the sequestered thread unit. Alternatively, an OS-managed thread unit may include dispatch code and may, without OS intervention, dispatch the filter routine to the sequestered thread unit. Other embodiments are also described and claimed.

28 Claims, 9 Drawing Sheets

(56) References Cited

OTHER PUBLICATIONS

Hankins et al., "Multiple Instruction Stream Processor", Intel Corp., IEEE 2006, (Hankins_May 10, 2006.pdf).*

Office Action Received for European Patent Application No. 07254666.6, mailed on Aug. 12, 2010, 5 pages of Office Action.

Pietrek, Matt, "A Crash Course on the Depths of Win32™ Structured Exception Handling", Microsoft Systems Journal, Jan. 1997, retrieved on Feb. 19, 2010 and available at http://www.microsoft.com/msj/0197/Exception/Exception.aspx.

Office Action received for European Patent Application No. 11009588.2, mailed on Feb. 22, 2013, 6 pages of Office Action.

Hankins, Multiple instruction 1-14 stream processor, Microarchitecture Research Lab, Intel Corporation, 12 pages.

European Search Report from related application 11009588.2 dated Feb. 11, 2013.

Fowler, et al., "Supporting User-Level Exception Handling on a Multiprocessor Micro-Kernal: Experiences with Platinum", University of Rochester.

China Office Action from related China Application 200710306275.8 mailed Aug. 29, 2009.

Office Action from related U.S. Appl. No. 11/173,326 mailed Nov. 3, 2009.

Office Action from related U.S. Appl. No. 11/173,326 mailed Apr. 26, 2010.

Office Action from related U.S. Appl. No. 11/173,326 mailed Feb. 16, 2011.

Office Action from related U.S. Appl. No. 11/173,326 mailed Oct. 12, 2011.

Office Action from related U.S. Appl. No. 11/027,445 mailed Aug. 4, 2009.

Office Action from related U.S. Appl. No. 11/027,445 mailed Feb. 16, 2010.

Office Action from related U.S. Appl. No. 11/027,445 mailed Jul. 21, 2010.

Office Action from related U.S. Appl. No. 11/027,445 mailed Jan. 13, 2011.

Office Action from related U.S. Appl. No. 11/027,445 mailed May 6, 2011.

Office Action from related U.S. Appl. No. 11/129,607 mailed Jul. 22, 2009.

Office Action from related U.S. Appl. No. 11/129,607 mailed Mar. 25, 2010.

Office Action from related U.S. Appl. No. 11/129,607 mailed Nov. 27, 2012.

Office Action from related U.S. Appl. No. 11/134,687 mailed Dec. 19, 2008.

Office Action from related U.S. Appl. No. 11/134,687 mailed Aug. 14, 2009.

Office Action from related U.S. Appl. No. 11/134,687 mailed Feb. 2, 2010.

Notice of Allowance from related U.S. Appl. No. 11/134,687 mailed Jul. 29, 2010.

* cited by examiner

STRUCTURED EXCEPTION HANDLING FOR APPLICATION-MANAGED THREAD UNITS

BACKGROUND

1. Technical Field

The present disclosure relates generally to information processing systems and, more specifically, to structured exception handling for user-level threads in a multi-threading system.

2. Background Art

In order to increase performance of information processing systems, such as those that include microprocessors, both hardware and software multi-threading techniques have been employed. Increasingly, multi-threading is supported in hardware. For instance, in one approach, processors in a multi-processor system, such as a chip multiprocessor ("CMP") system, may each act on one of the multiple software threads concurrently. In another approach, referred to as simultaneous multi-threading ("SMT"), a single physical processor is made to appear as multiple logical processors to operating systems and user programs. For SMT, multiple software threads can be active and execute simultaneously on a single processor without switching. That is, each logical processor maintains a complete set of the architecture state, but many other resources of the physical processor, such as caches, execution units, branch predictors, control logic and buses are shared. For SMT, the instructions from multiple software threads thus execute concurrently on each logical processor.

For a system that supports concurrent execution of software threads, such as SMT and/or CMP systems, an operating system application may control scheduling and execution of the software threads on thread execution resource(s). However, other thread execution resources that are not controlled by the operating system may also be available to a programmer and may be controlled by user-level code. Common operating systems do not provide for data structures to maintain local data for user-level threads that may execute on such resources.

BRIEF DESCRIPTION OF THE DRAWINGS

Embodiments of the present invention may be understood with reference to the following drawings in which like elements are indicated by like numbers. These drawings are not intended to be limiting but are instead provided to illustrate selected embodiments of data structures and techniques for structured exception handling for user-level threads in a multi-threading system.

DETAILED DESCRIPTION

The following discussion describes selected embodiments of methods, systems, data structures, apparatuses and mechanisms to provide structured exception handling for user-level threads that are neither created nor managed by the operating system but instead are created and managed by user-level code.

Such user-level threads, sometimes referred to herein as shared resource threads or "shreds", are sequences of instructions that a programmer may cause to be executed based on instructions in user-level code. Multiple shreds may be associated with the same OS-generated or "native" thread and may execute concurrently. For at least one embodiment, the shreds are scheduled to run on available hardware resources (such as, e.g., by a scheduler in a software library or otherwise residing in user space) without intervention of an operating system. The embodiments described herein may be utilized with single-core or multi-core multi-threading systems.

As used herein, a thread unit, also interchangeably referred to herein as a hardware thread context or "sequencer", may be any physical or logical unit capable of executing a thread or shred.

In the following description, numerous specific details such as processor types, multi-threading environments, system configurations, data structures, and specific operating system and structured exception handling processing have been set forth to provide a more thorough understanding of embodiments of the present invention. It will be appreciated, however, by one skilled in the art that the invention may be practiced without such specific details. Additionally, some well known structures, circuits, and the like have not been shown in detail to avoid unnecessarily obscuring the present invention.

Figure 1:
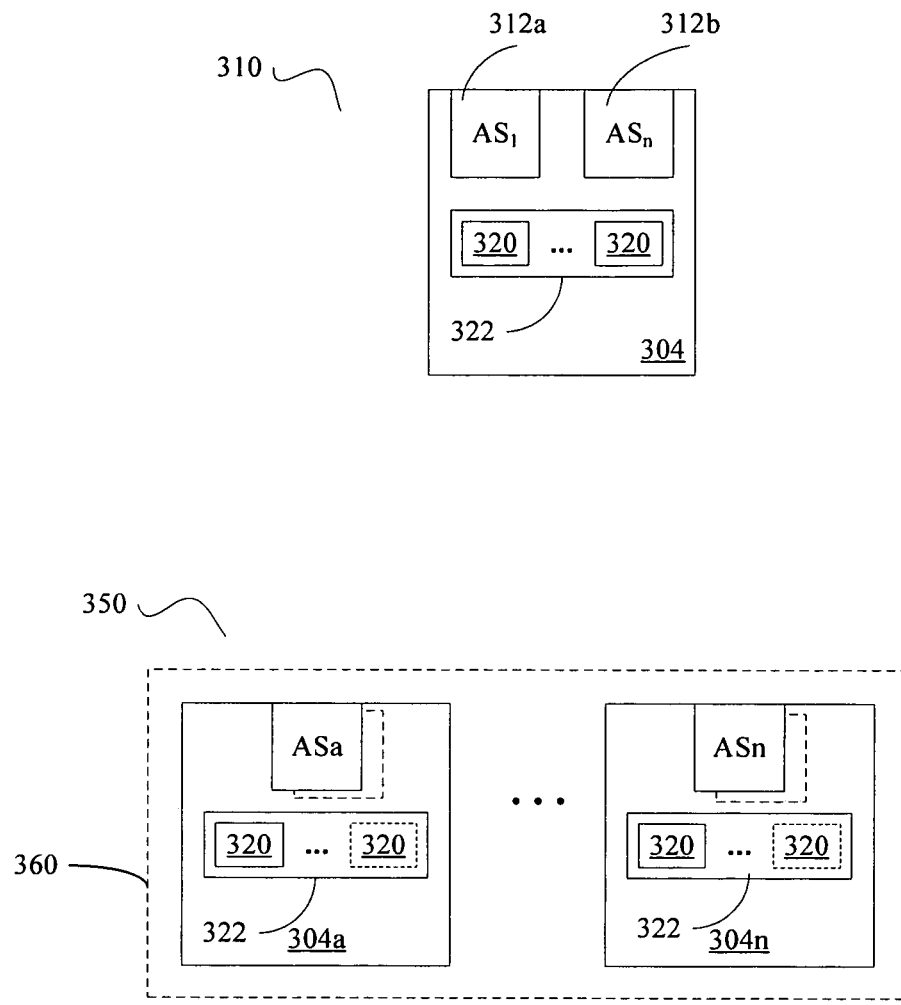
FIG. 1 is a block diagram illustrating various embodiments of multi-sequencer systems.

FIG. 1 is a block diagram illustrating selected hardware features of embodiments 310, 350 of a multi-sequencer system that supports user-level control of threads. FIG. 1 illustrates selected hardware features of a single-core multi-sequencer multi-threading environment 310. FIG. 1 also illustrates selected hardware features of a multiple-core multi-threading environment 350, where each sequencer is a separate physical processor core.

In the single-core multi-threading environment 310, a single physical processor 304 is made to appear as multiple logical processors (not shown), referred to herein as $LP_1$ through $LP_n$, to operating systems and user programs. Each logical processor $LP_1$ through $LP_n$ maintains a complete set of the architecture state $AS_1$-$AS_n$, respectively. The architecture state 312a, 312b may include, for at least one embodiment, data registers, segment registers, control registers, debug registers, and most of the model specific registers.

The logical processors $LP_1$-$LP_n$ share most other resources of the physical processor 304, such as caches, execution units, branch predictors, control logic and buses. Although such features may be shared, each thread context in the multithreading environment 310 can independently generate the next instruction address (and perform, for instance, a fetch from an instruction cache, an execution instruction cache, or trace cache).

Thus, the processor 304 includes logically independent next-instruction-pointer and fetch logic 320 for each thread context, even though the multiple logical sequencers may be implemented in a single physical fetch/decode unit 322. The next-instruction-pointer and fetch logic 320 is to determine the next instruction to be executed for the given thread or shred.

For a single-core embodiment, a sequencer thus may be a logical thread unit. In such case, the term "sequencer" encompasses at least the next-instruction-pointer and fetch logic 320 for a thread context, along with at least some of the associated architecture state, AS 312, for that thread context. It should be noted that the sequencers of a single-core multi-threading system 310 need not be symmetric. For example, two logical sequencers for the same physical core 304 may differ in the amount of architectural state information that they each maintain.

A single-core multithreading system can implement any of various multithreading schemes, including simultaneous multithreading (SMT), switch-on-event multithreading (SoeMT) and/or time multiplexing multithreading (TMUX). When instructions from more than one hardware thread contexts (or logical processor) run in the processor concurrently at any particular point in time, it is referred to as SMT. Otherwise, a single-core multithreading system may implement SoeMT, where the processor pipeline is multiplexed between multiple hardware thread contexts, but at any given time, only instructions from one hardware thread context may execute in the pipeline. For SoeMT, if the thread switch event is time based, then it is TMUX.

Thus, for at least one embodiment, the multi-sequencer system 310 is a single-core processor 304 that supports concurrent multi-threading. For such embodiment, each sequencer is a logical processor having its own next-instruction-pointer and fetch logic 320 and its own architectural state information 312, although the same execution resources of the single processor core 304 may be shared among concurrently-executing threads so that the same core 304 executes all instructions for the concurrent threads.

FIG. 1 also illustrates at least one embodiment of a multi-core multi-threading system 350. Such a system 350 includes two or more separate physical processors 304a-304n that is each capable of executing a different thread/shred such that execution of at least portions of the different threads/shreds may be ongoing at the same time. Each processor 304a through 304n includes a physically independent fetch unit 322 to fetch instruction information for its respective thread or shred. For an embodiment where each processor 304a-304n executes a single thread/shred, the fetch/decode unit 322 implements a single next-instruction-pointer and fetch logic 320.

However, for at least one embodiment each processor 304a-304n supports multiple thread contexts; that is, each processor 304a-304n may be a multi-threaded single core processor such as that shown in embodiment 310. For such embodiment, the fetch/decode unit 322 of each core 304 in the system 350 implements distinct next-instruction-pointer and fetch logic 320 for each supported thread context, and each thread context maintains a separate copy of the architecture state (AS). The optional nature of additional next-instruction-pointer and fetch logic 320 and additional copies of the architecture state in a multiprocessor environment 350 are denoted by dotted lines in FIG. 1.

For at least one embodiment of the multi-core system 350 illustrated in FIG. 1, each of the sequencers may be a processor core 304, with the multiple cores 304a-304n residing in a single chip package 360. As is described immediately above, each core 304a-304n may be either a single-threaded or multi-threaded processor core. The chip package 360 is denoted with a broken line in FIG. 1 to indicate that the illustrated single-chip embodiment of a multi-core system 350 is illustrative only. For other embodiments, processor cores of a multi-core system may reside on separate chips. That is, the multi-core system may be a multi-socket symmetric multiprocessing system.

For ease of discussion, the following discussion focuses on embodiments of the multi-core system 350. However, this focus should not be taken to be limiting, in that the mechanisms described below may be performed in either a multi-core or single-core multi-sequencer environment.

Figure 2:
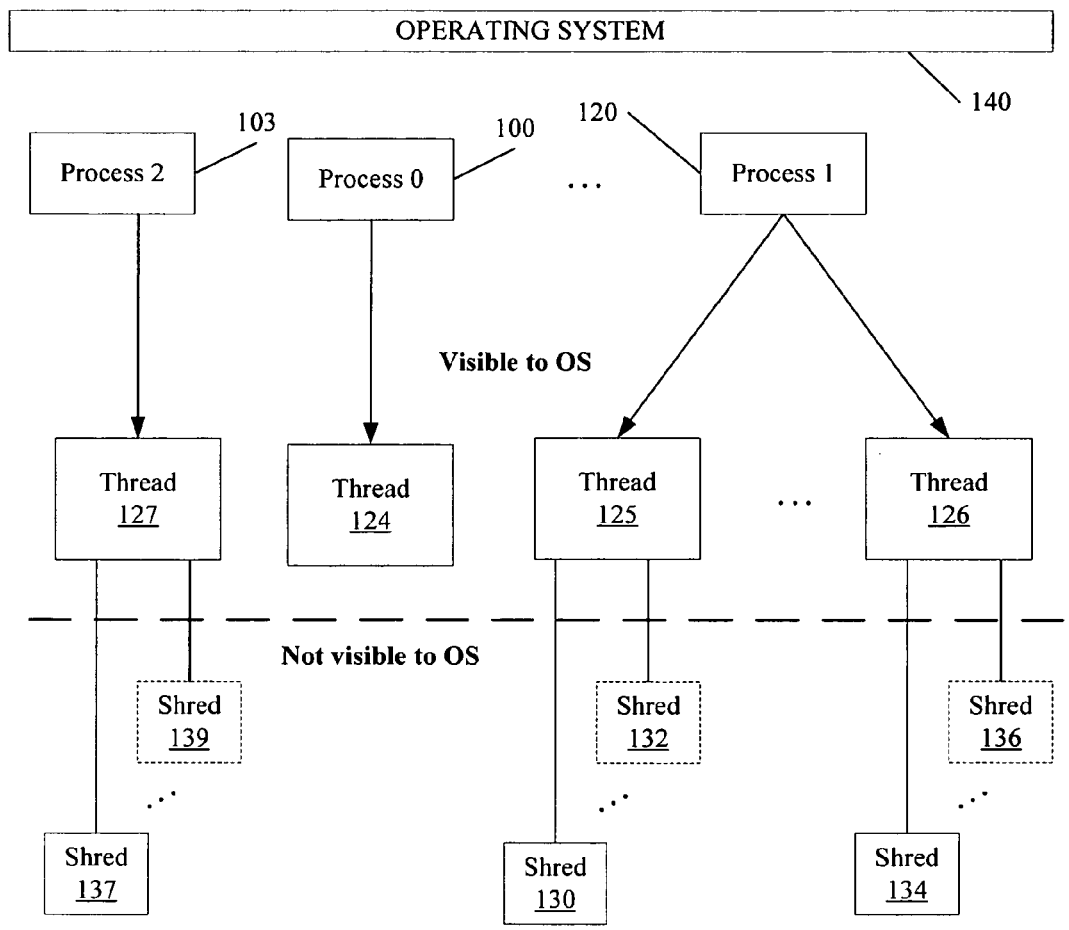
FIG. 2 is a block diagram presenting a graphic representation of a general parallel programming approach for a multi-sequencer system.

FIG. 2 is a block diagram illustrating a graphic representation of a parallel programming approach on a multi-sequencer multi-threading system. A shared-memory multiprocessing paradigm may be used in an approach referred to as parallel programming. According to this approach, an application programmer may express parallelism in a software program, sometimes referred to as an "application" or "process," through multiple threads to be run concurrently. All threads of the same software program ("process") share a common logical view of memory.

FIG. 2 illustrates processes 100, 103, 120 that are visible to an operating system ("OS") 140. These processes 100, 103, 120 may be different software application programs, such as, for example, a word processing program, a graphics program, and an email management program. Commonly, each process operates in a different virtual address space.

The operating system ("OS") 140 is commonly responsible for managing the user-defined tasks for a process. While each process has at least one task (see, e.g., process 0 and process 2, bearing reference numerals 100 and 103, respectively), others may have more than one (e.g., Process 1, bearing reference numeral 120). The number of processes illustrated in FIG. 2, as well as the number of user-defined tasks for each process, should not be taken to be limiting. Such illustration is for explanatory purposes only.

FIG. 2 illustrates that a distinct thread 125, 126 for each of the user-defined tasks associated with a process 120 may be created by operating system 140, and the operating system 140 may map the threads 125, 126 to thread execution resources. Similarly, a thread 127 for the user-defined task associated with process 103 may be created by the operating system 140; so may a thread 124 for the user-defined task associated with process 0 (100).

The OS 140 is commonly responsible for scheduling these threads 124, 125 . . . 126, 127 for execution on the execution resources. The threads associated with the same process have the same virtual memory address space.

Because the OS 140 is responsible for creating, mapping, and scheduling threads, the threads 124, 125 . . . 126, 127 are "visible" to the OS 140. In addition, embodiments of the present invention comprehend additional user-level threads 130-139 that are not visible to the OS 140. That is, the OS 140 does not create, manage, or otherwise control these additional user-level threads 130-139.

These additional threads, which are neither created nor controlled by the OS 140, and may be scheduled to execute concurrently with each other, are sometimes referred to herein as "shreds" 130-139 in order to distinguish them from OS-visible threads and to further distinguish them from other user-level threads that may not be executed concurrently with each other for the same OS-visible thread. That is, multiple shreds that are associated with the same OS-visible thread may execute concurrently with each other.

The shreds are created and managed by user-level programs (referred to as "shredded programs") and may be scheduled to run on sequencers that are sequestered from the operating system. A sequestered sequencer is not managed by the operating system but is instead managed by user-level application code. For example, the OS-managed thread 125 illustrated in FIG. 2 may execute on one sequencer, not shown, that is visible to the OS, while each of the active shreds 130-132 may execute on other, OS-sequestered, sequencers (see, e.g., "seq 1"-"seq 4", respectively of FIG. 3) that are not managed by the OS. For sequencers that are sequestered from the OS, streams of instructions are scheduled for execution by a user-level scheduler. An OS-sequestered sequencer is thus managed by user-level applications, rather than the OS, and is therefore referred to herein as an "application managed sequencer" or "AMS".

FIG. 2 illustrates one process 103 associated with one OS-scheduled thread 127 and also illustrates another process 120 associated with two or more threads 125-126. In addition, each process 103, 120 may additionally be associated with one or more shreds 137-139, 130-136, respectively. Dotted lines and ellipses are used in FIG. 2 to represent optional additional shreds.

The representation of two threads 125, 126 and four shreds 130-136 for Process 1 (120) and of one thread 127 and two shreds 137, 139 for Process 2 (103) is illustrative only and should not be taken to be limiting. Embodiments of the present invention do not necessarily impose an upper or lower bound on the number of threads or shreds associated with a process. Regarding a lower bound for threads, FIG. 2 illustrates that every process running at a given time is associated with at least one thread.

However, the threads need not necessarily be associated with any shreds at all. Thus, no lower bound is imposed for shreds. For example, Process 0 (100) illustrated in FIG. 2 is shown to run with one thread 124 but without any shreds at the particular time illustrated in FIG. 2.

Regarding an upper bound, the number of OS-visible threads associated with a process may be limited by the OS program. However, the upper bound for the cumulative number of shreds associated with a process is limited, for at least one embodiment, only by the number of shred execution resources (e.g. number of sequencers) available at a particular time during execution.

FIG. 2 illustrates that a second thread 126 associated with a process 120 may have a different number (n) of shreds associated with it than the first thread 125. The optional nature of additional shreds is denoted with ellipses and broken lines in FIG. 2.

The common logical view of memory that is associated with all threads for a program or process may be referred to herein as an "application image." For embodiments of the present invention, this application program image is also shared by shreds associated with a process.

Figure 3:
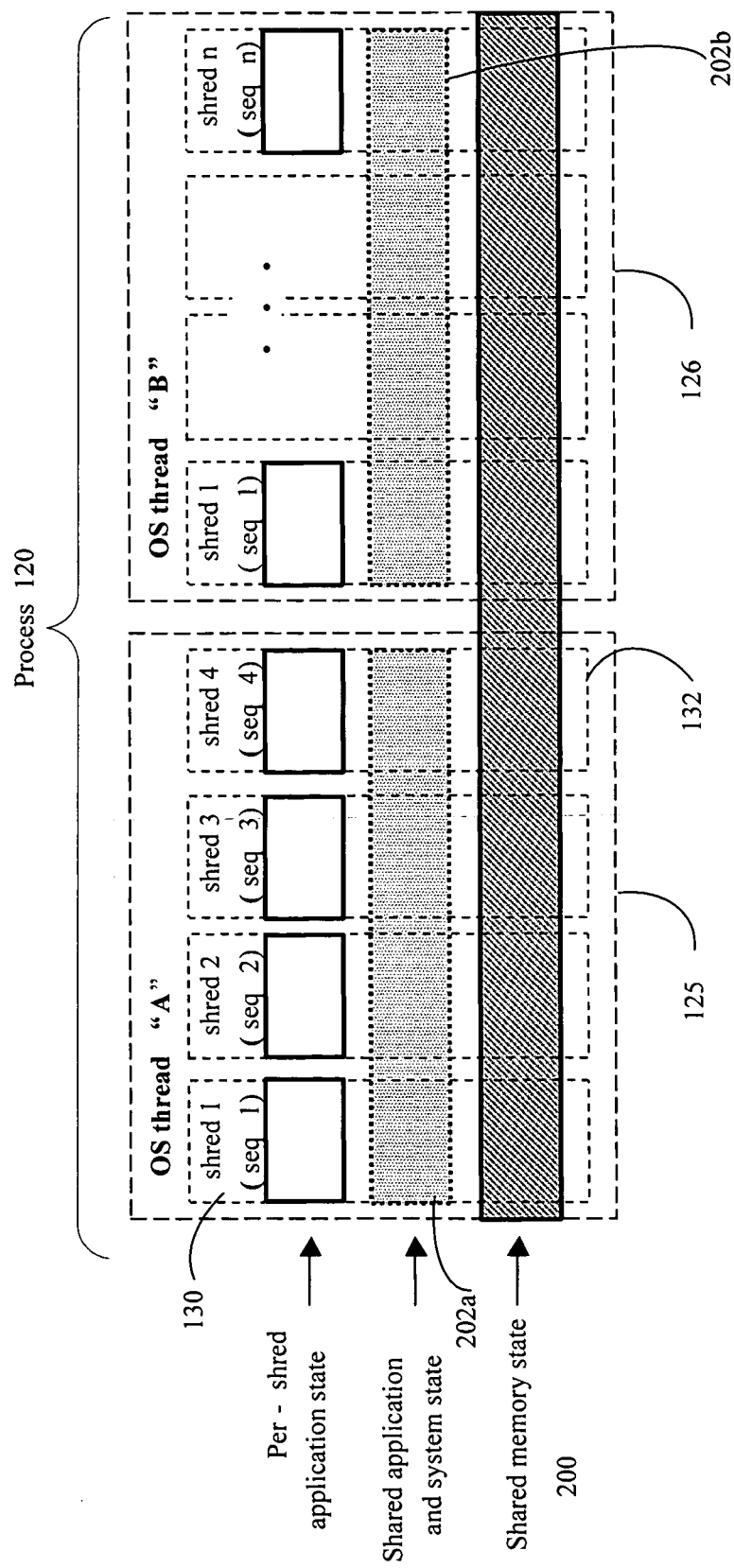
FIG. 3 is a block diagram illustrating shared memory and state among threads and user-level threads for at least one embodiment of user-level multithreading.

FIG. 3 is a block diagram illustrating an example of shared memory states among processes, threads, and shreds. FIG. 3 shows a graphical representation of a process 120, threads 124, 125, 126 and shreds 130-132 illustrated in FIG. 2. FIG. 3 is discussed below with reference to FIG. 2 as well.

FIG. 3 illustrates that a particular logical view 200 of memory is shared by all threads 125, 126 associated with a particular process 120. The OS-sequestered sequencers maintain a set of ring 0 states identical to those on the OS-visible sequencers. These shared ring-0 architectural states are typically those responsible for supporting a common shared memory address space between the OS-visible sequencer and OS-sequestered sequencers. For example, for an embodiment based on IA-32 architecture, CR0, CR2, CR3, CR4 are some of these shared ring-0 architectural states. Shreds thus share the same execution environment (virtual address map) that is created for the threads associated with the same process.

FIG. 3 illustrates that each thread 125, 126 has its own application and system state 202a, 202b, respectively. FIG. 3 illustrates that the application and system state 202 for a thread 125, 126 is shared by all shreds (for example, shreds 130-132) associated with the particular thread. For at least one embodiment, for example, all shreds associated with a particular shred may share the ring 0 states and at least a portion of the application states associated with the particular thread.

Accordingly, FIG. 3 illustrates that a system for at least one embodiment of the present invention may support a 1-to-many relationship between an OS-visible thread, such as thread 125, and the shreds 130-132 (which are not visible to the OS) associated with the thread. The shreds are not "visible" to the OS (see 140, FIG. 2) in the sense that a programmer, not the OS, may employ user-level techniques to create, synchronize and otherwise manage and control operation of the shreds. While the OS 140 is aware of, and manages, one or more threads 125 . . . 126, the OS 140 is not aware of, and does not manage or control, shreds. As used herein, the terms "thread" and "shred" include, at least, the concept of a set of instructions to be executed concurrently with other threads and/or shreds of a process. As used herein, a distinguishing factor between a thread (which is OS-controlled) and a shred (which is not visible to the operating system and is instead user-controlled), which are both instruction streams, lies in the difference of how scheduling and execution of the respective thread and shred instruction streams are managed. A thread is generated in response to a system call to the OS. The OS generates that thread and allocates resources to run the thread. Such resources allocated for a thread may include data structures that the operating system uses to control and schedule the threads.

In contrast, at least one embodiment of a shred is generated via a user level software "primitive" that invokes an OS-independent mechanism for generating and scheduling a shred that the OS is not aware of. A shred may thus be generated in response to a user-level software call. For at least one embodiment, the user-level software primitives may involve user-level (ring-3) instructions that invoke hardware or firmware to create a shred. These instructions may be defined as part of the instruction set architecture (ISA) for a processor.

The shred thus created may be scheduled by hardware and/or firmware and/or user-level software. The OS-independent mechanism may be software code that sits in user space, such as a software library. Thus, instead of relying on the operating system to manage the mapping between thread unit hardware and shreds, scheduler logic in user space may manage the mapping. A further discussion of user-level shredding instructions may be found in copending patent application U.S. patent Ser. No. 11/173,326, entitled "A Mechanism For Instructions Set-Based Thread Execution on a Plurality of Instruction Sequencers."

It should be noted that the sequencers of a system capable of performing embodiments of techniques disclosed herein need not be symmetric. Sequencers may differ in any manner, including those aspects that affect quality of computation. For example, the sequencers may differ in terms of power consumption, speed of computational performance, functional features, or the like.

In the following section background information regarding structured exception handling for OS-managed threads is presented. Thereafter are presented selected embodiments of structured exception handling for shreds in accordance with the present invention.

Figure 4:
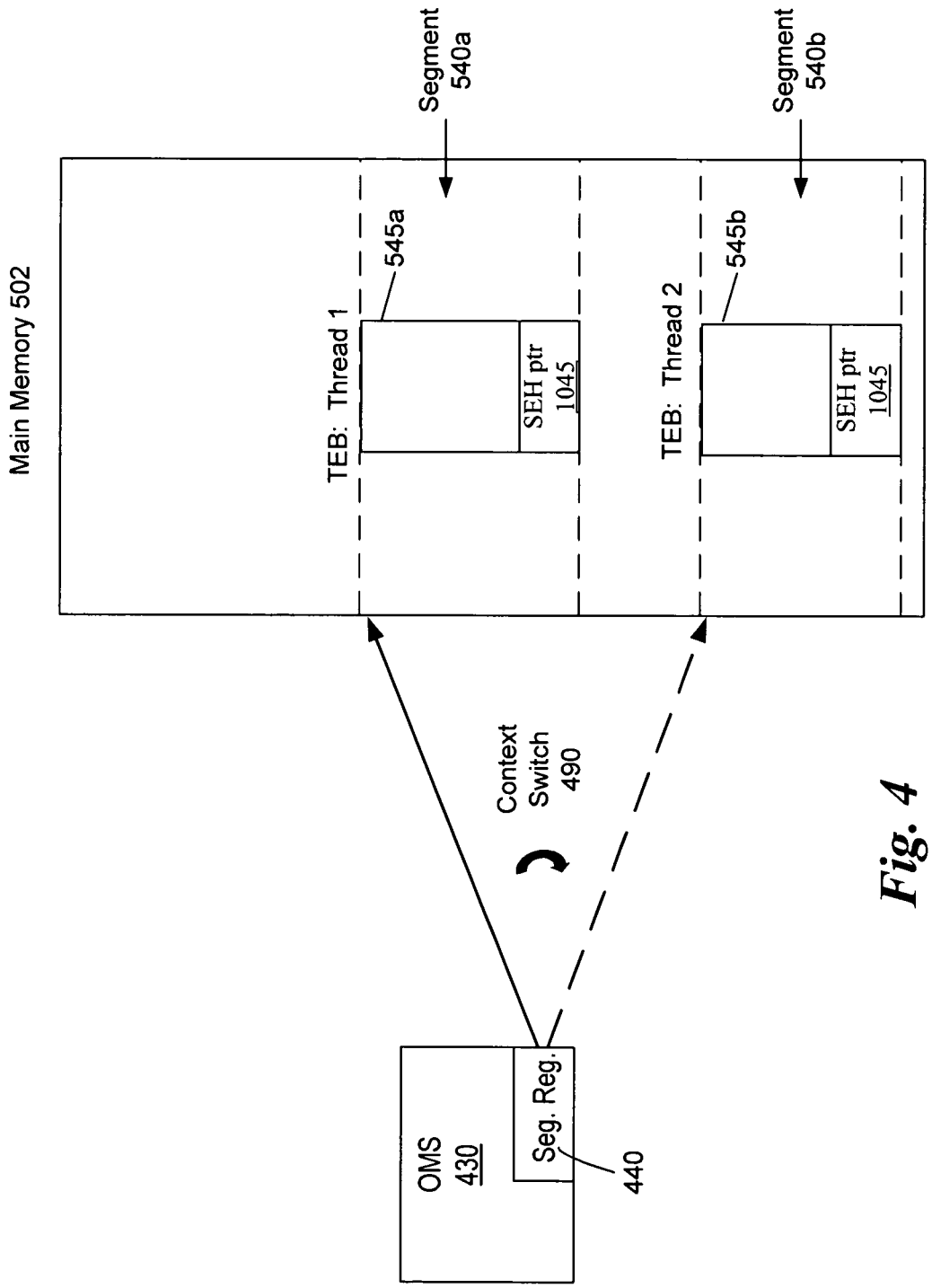
FIG. 4 is a block data flow diagram that illustrates at least one embodiment of a mechanism to maintain thread-specific local data in a multi-threading system.

FIG. 4 is a block diagram illustrating a prior art data management mechanism for OS-managed threads that run on OS-managed sequencers. OS-managed sequencers 430 are referred to herein as "OMS".

FIG. 4 illustrates a thread environment block, or "TEB" 545a, 545b, which is a data structure created and maintained by the operating system (see, e.g., 140 of FIG. 2) for use in multi-threaded applications. The TEB 545a, 545b may, for certain systems, be referred to by other names such as a thread information block or a thread control block. For ease of discussion, the structure 545a, 545b is referred to herein as a TEB, but one of skill in the art will recognize that the representation of structure 545a, 545b is intended to encompass any similar structure, regardless of a particular system's nomenclature.

For at least some common systems, critical operating system services such structured exception handling depend on the presence of a TEB data structure 545a, 545b for each thread.

Structured exception handling ("SEH") is an OS-provided service, complemented with support from the compiler, for handling exceptional events that occur during program execution. Control is reflected back to the application in which the exceptional event occurred, so that the application rather than the OS handles the exception. Such exceptional events may include, for example, attempting to execute a privileged instruction while in a non-privileged mode (general protection fault), divide-by-zero errors, null pointer accesses (page faults), and the like. Applications may rely on the structured exception handling facility to help debug fatal events that occur during execution, to clean up important data structures in the event of unexpected termination, and to gracefully recover from a fault condition to continue execution. In addition, some applications may even use the SEH facility as part of normal operation; for example, Java virtual machines may use the SEH facility to dynamically optimize a guest application's byte code.

Figure 5:
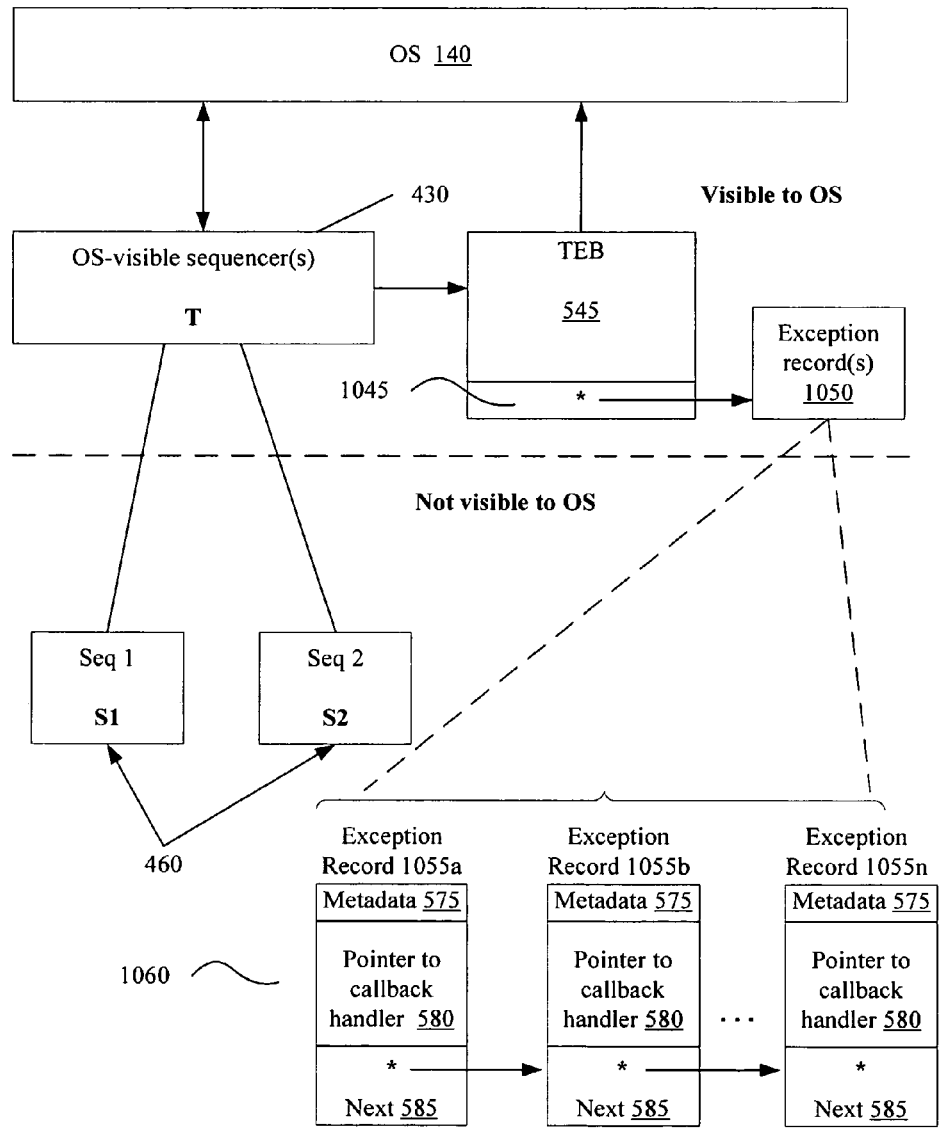
FIG. 5 is a block diagram illustrating at least one embodiment of data structures utilized for structured exception handling.

FIG. 5 illustrates at least one common embodiment of structured exception handling records for OS-managed threads (such as, e.g., "T") that run on an OMS 430. As is stated above, an application programmer may utilize structured exception handling in code to facilitate user-provided handling of certain exceptional events that occur while executing the code in user mode, rather than relying on the operating system 140 to run a default handler to handle the exceptions.

Commonly, to invoke structured exception handling, an application programmer may include instructions in the code that registers a filter routine with the OS 140. In turn, the OS 140 dispatches the filter routine when it encounters an exception in user mode during execution of the code, thus allowing the user mode application itself to handle the exception that happened when the application was executing. An application may choose to process, or "catch", different exceptions during the course of execution by registering and de-registering different filter routines. The exact mechanism for managing these exceptions depends on the specific implementation of the operating system 140 and the compiler (not shown). One common implementation of handling these exceptions is the Structured Exception Handling facility provided by Microsoft's WINDOWS operating systems. While the following discussion is based on features of the Microsoft WINDOWS SEH facility, one of skill in the art will recognize that the mechanisms described below also may be applied to other user-level exception handling mechanisms.

FIG. 5 illustrates that one of the fields of the TEB 545 may be a pointer 1045 to one or more exception registration records 1050. The exception registration record may be a single record, or may be a structure (table, array, linked list) of multiple records 1055a, 1055b . . . 1055n. For at least one embodiment, the registration records 1050 may be a linked list 1060 of records 1055, each of which points to an exception handler routine. Each of the multiple records 1055a, 1055b . . . 1055n may include a pointer 580 to an exception filter routine and a next-record pointer 585, along with some additional metadata 575.

The operating system 140 provides the basic SEH facility but relies on the application program and compiler to define and register the filter routines. The compiler may provide syntax that may be used by an application programmer to register exception filter routines associated with "guarded" blocks of code. For example, some compilers provide a "_try{ }" clause to delineate a block of code that may incur exceptions and a corresponding "_except{ }" clause to associate a user-level exception handler that is to be executed should an exception occur within that delineated code. The application programmer may use the compiler's try/except syntax to insert, or "register", exception filters into the linked list 1060 pointed to by the TEB 545.

Upon encountering an exception, the operating system calls the first exception filter in its list of all registered filters. The exception filter allows the application a first chance to correct the cause of the exception or begin cleanup of important data structures. The return from the exception filter directs the OS to one of three paths: continue execution at the fault/trap, continue looking for a suitable exception filter in your list, or execute the exception handler.

This registration process, specified by the try/except syntax, is transformed into direct reads from, and writes to, the TEB 545. Upon encountering an exception, the SEH service of the OS 140 then searches the linked list 1060 of user-supplied exception handlers to determine the next course of action.

Accordingly, the application and system libraries may cooperate to maintain the list 1060 of exception registration records 1055 for each thread. The compiler 140 may translate the application's_try and_except statements to code that inserts and removes an exception registration record 1055 to and from a list 1060. The head (see 1055a) of a thread's exception registration record list 1060 refers to the currently-active record and is pointed to (see 1045) by the thread's TEB 545.

Inserting a new exception registration record 1055 into the list 1060 involves pointing the new record's next record pointer 585 to the head (1055a) of the list 1060, adding the new record 1055 to the stack (not shown), and then updating the head of the list 1045 in the TEB 545 to point to the new record 1055.

Removing an exception registration record 1055 from the list 1060 involves updating the head of the list (1045) in the TEB 545 to point to the next record (1055b) in the list 1060.

In essence, the list 1060 of exception records 1055 represents nested filter routines, where the head of the list 1060 refers to the currently-active exception registration records 1055 and each subsequent record 1055 is the parent of the previous record. For simplicity, the terms "exception registration record" and "registration record" are used interchangeably herein.

Briefly referring back to FIG. 4, it is shown how the operating system 140 manages the TEB data structure 545 on at least some embodiments of a computing system. FIG. 4 shows that a unique TEB structure 545a, 545b is created for each native thread, Thread 1 and Thread 2, respectively. One of the processor's registers 440 points to the currently-executing thread's TEB structure 545. For the example shown in FIG. 4, it is assumed that Thread 1 is the currently-executing thread. Upon a context switch, 490, the OS (see 140, FIG. 5) directs the register 440 to point to the second thread's TEB 545b. FIG. 4 also shows the pointer 1045 to the head of the SEH exception registration record list 1060 for each of the thread, Thread 1 and Thread 2; this pointer is contained within the TEB data structure.

We now return to FIG. 5. The structured exception handling mechanism 510 illustrated in FIG. 5 is thus a dynamic, OS-supported mechanism that permits registration of a filter handler routine that is to be invoked to transfer control from the operating system 140 to the user-level exception handler. However, because the OS 140 does not provide a TEB 545 for shreds that run on OS-sequestered sequencers 460, SEH is not supported for shreds by the mechanism 510 illustrated in FIG. 5.

That is, FIG. 5 illustrates a TEB 545 that has been allocated for the main thread T by the operating system 140. However, FIG. 5 further illustrates that no TEB has been allocated by the operating system 140 for either of the two shreds (S1 and S2) running on sequestered sequencers 460 ("Seq 1" and "Seq 2", respectively) because they are not visible to the OS 140.

Figure 6:
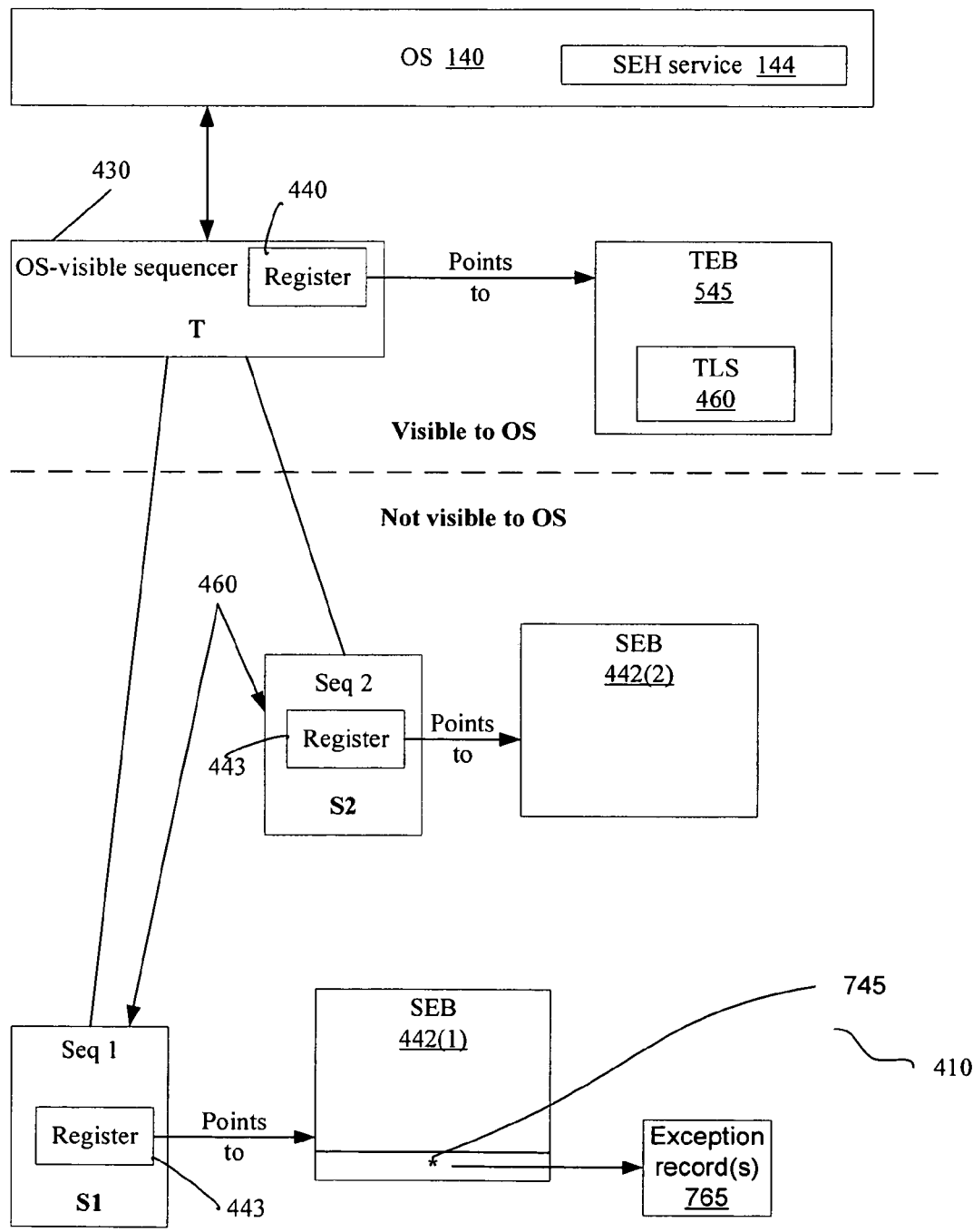
FIG. 6 is a block diagram illustrating a mechanism to maintain shred-specific local data for a multi-threading system that includes one or more sequestered sequencers.

Reference is now made to FIG. 6, which is a block diagram illustrating at least one embodiment of a data management mechanism for shred-local data in a multi-shredding system 410. The embodiment of the multi-shredding system 410 illustrated in FIG. 6 includes one or more OMS sequencers 430 that are visible to, and controlled by, operating system 140.

FIG. 6 illustrates that the multi-shredding system 410 also includes one or more sequencers (Seq 1, Seq 2) that are sequestered from the operating system 140. The sequestered sequencers (Seq 1, Seq 2) are collectively referred to in FIG. 6 as Application Managed Sequencers ("AMS") 460.

The system 410 may thus include multiple sequencers 460 that may be managed by an application developer's software code, outside of operating system control. The developer may utilize in his code instructions that can cause creation of, and concurrent execution of, streams of instructions, or "shreds", on the sequestered sequencers 460. Shreds running on the OS-sequestered sequencers 460 do not commonly have access to a valid TEB instance 545, because the operating system 140 typically reserves an instance of the TEB 545 only upon creation of native threads, but not for shreds.

For at least one embodiment, the sequencers 430, 460 illustrated in FIG. 6 may differ in terms of functionality. An example of functional asymmetry illustrated in FIG. 6 shows that at least one sequencer 430 may be visible to the OS 140 and may therefore be capable of performing "ring 0" operations such as performing system calls, servicing a page fault, and the like.

On the other hand, one or more other sequencers 460 may be sequestered from the OS 140, and therefore be incapable of performing ring 0 operations. However, this is just one example of functional asymmetry. The sequencers 430, 460 of a multi-sequencer system 410 may also differ in any other manner, such as dimensions, word and/or data path size, topology, memory, power consumption, number of functional units, communication architectures (multi-drop bus vs. point-to-point interconnect), or any other metric related to functionality, performance, footprint, or the like.

For the sample embodiment illustrated in FIG. 6, each of the sequestered sequencers 460 have been initialized to be able to execute shreds (e.g., S1 and S2) associated with a thread. The example illustrated in FIG. 6 shows two shreds, S1 and S2, that have been generated by a thread, T, which is running on an OS-visible sequencer 430. The shreds S1 and S2 have been scheduled to execute on sequestered sequencers Seq 1 and Seq 2, respectively.

Because the system 410 illustrated in FIG. 6 allows a programmer to manage execution of shreds, S1 and S2, on AMS sequencers Seq 1, Seq 2 outside control of the operating system 140, the system 410 includes a mechanism to create and manage data structures 442 to maintain shred-local data for the shreds S1, S2. Such data structures are referred to herein as shred environment blocks ("SEB") 442(1), 442(2).

There are many options for the structure, organization and management of a shred environment block 442. For the embodiments described herein, the structure, organization and management were designed with some specific goals in mind.

The first goal is the structure of embodiments of the SEB 442 described herein has been designed in order to emulate the design of a commonly-known TEB 545 structure. In this manner, a programmer familiar with a TEB 545 may understand the structure of the SEB 442 without significant additional effort. Thus, the location of each field in the SEB 442 emulates the organization of such fields in the TEB 545.

The second goal is that embodiments of the SEB 442 described herein have been designed to support structured exception handling on user-level shreds. FIG. 6 illustrates that the SEB structure 442 may include a field to support structured exception handling in a manner similar to that discussed above in connection with FIG. 5. The SEB structure 442 may include, in a field having the same offset as that in a TEB structure 545, a pointer 745 to one or more exception registration records 765 for the shred. The application program may directly read from, and write to, the SEB structure 442 to maintain the list of registration records. As previously described, the compiler-provided the try/except syntax can also be used by the program to insert, or "register", exception handlers into the records 765 pointed to by the pointer 745 in the SEB 442. This registration process, specified by the try/accept syntax, is transformed into direct reads from, and writes to, the SEB 442.

When an exception occurs, the SEH service 144 of the OS 140 searches the linked list of user-supplied exception handlers to determine the next course of action. {It should be noted that, for at least one embodiment, the SEH service 144 of the OS 140 runs at the user-level privilege level, such as ring 3}. In this manner, the SEB 442 maintains data that may be used to support structured exception handling for user-level shreds.

Disclosed in the following sections are embodiments of two different methods that may be utilized to support SEH for shreds. The first method discussed below bypasses the OS and performs SEH for shreds completely in user space. The second method discussed below utilizes proxy execution in order to invoke the OS to perform certain SEH processing on behalf of an AMS that is sequestered from the OS.

Figure 7:
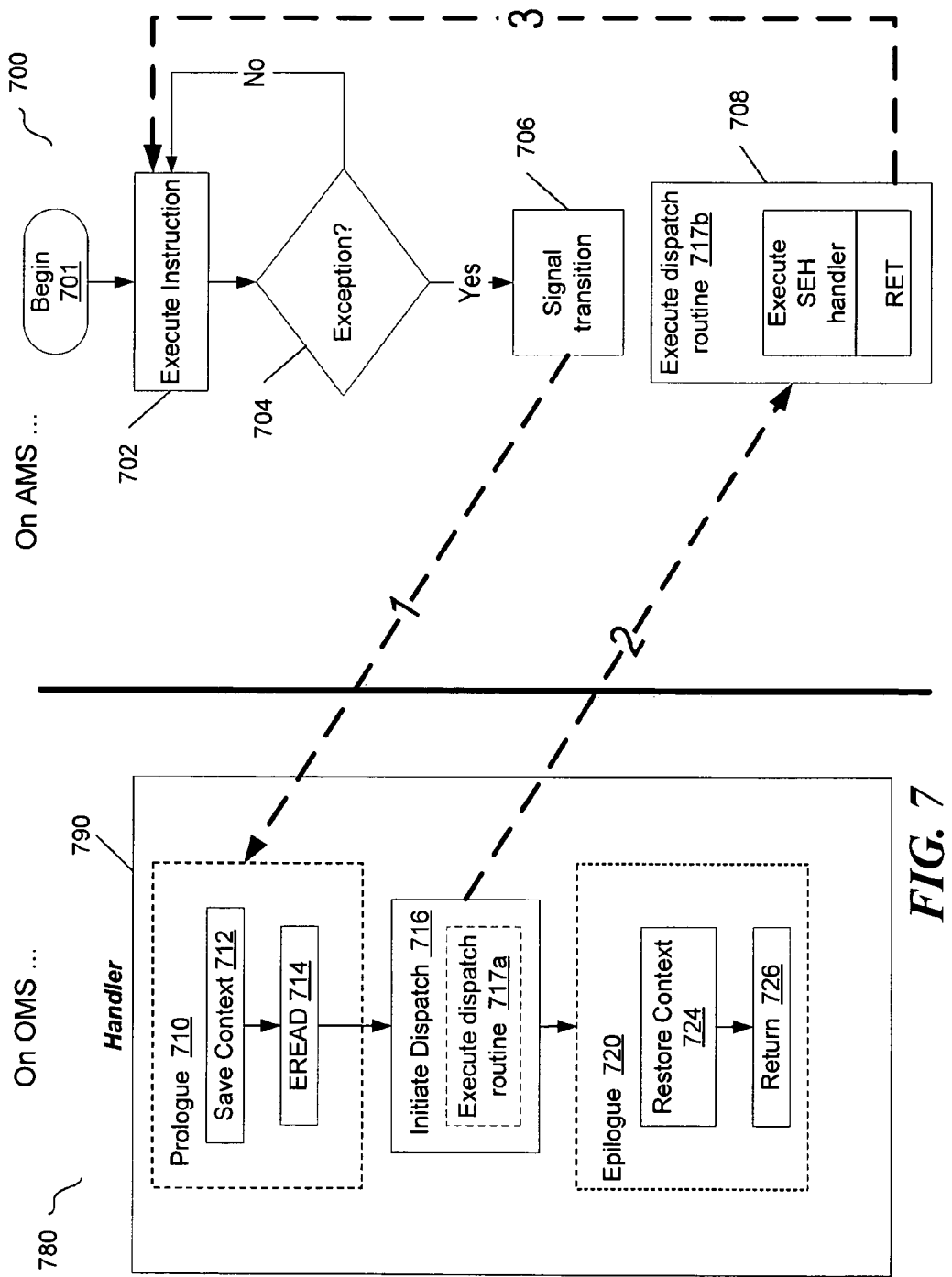
FIG. 7 is a data flow diagram illustrating at least one embodiment of a method for structured exception handling, which bypasses the operating system, for an exception that occurs on a thread unit that is sequestered from the operating system.

FIG. 7 is a flowchart illustrating at least one embodiment of a method 700 for invoking structured exception handling for an exception that occurs on a sequestered AMS, wherein the handling bypasses the operating system altogether. FIG. 7 further illustrates a method 780 for handling the user-level exception. For at least one embodiment, the invoking method 700 may be performed by an application running on an application-managed sequencer ("AMS"), and the handling method 780 may be performed by a handler routine 790 running on an OS-managed sequencer ("OMS").

FIG. 7 illustrates that the method 700 for invoking application-based structured exception handling may begin at block 701 and proceeds to block 702. At block 702, the next instruction of the shred running on an AMS is executed.

If the instruction is one that would cause a transition from user privilege level (e.g., ring 3) to a restricted privilege level (e.g., ring 0), then the potential transition may be detected at block 704. The ring-level transition is just one example of the types of events that may trigger structured exception handling, and should not be taken to be limiting. Any instruction whose execution triggers an exception may cause the decision box at block 704 to evaluate to "yes".

For at least one embodiment, execution of the instruction at block 702 may cause a processor state that may satisfy a scenario (explained below), which may in turn trigger an asynchronous transfer of control to handler code 790. If a potential privilege level transition or other exception is detected at block 704, then processing proceeds to block 706 where control is transferred (see transfer "1") to the appropriate handler code 790 for the particular detected scenario condition. Such control may be transferred in response to one or more instructions that effect a control transfer if a particular set of conditions (a "scenario") are met. If not, processing returns to block 702, and the method 700 continues until the end of the shred is reached.

Regarding "scenarios", it is assumed for at least one embodiment that the AMS performing the method 700 supports user-level asynchronous signaling. Certain embodiments of such signaling mechanisms are further described in co-pending application Ser. No. 11/395,884, "A Programmable Event-Driven Yield Mechanism" and Ser. No. 11/134,687, "A Programmable Event Driven Yield Mechanism Which May Activate Service Threads".

A user-level asynchronous hardware mechanism may report certain events or states, or combinations of events or states, referred to herein as "scenarios", directly to a user-level thread running on a microprocessor without requiring the traditional intervention of the operating system. (See the user-level thread's detection of the event at block 704).

Such user-level interrupts or user-level exceptions are based on a hardware mechanism that saves sufficient information about the current state of the thread and redirects the thread to execute a pre-determined block of "handler" code 790 to respond to the event. (See block 706). As part of the handler code 790 the thread can perform any work it wishes to do and then return to the execution path it was on before the event (see return of control 788). Alternatively, the handler code may instead choose to not return the execution path and instead continue to an entirely different set of tasks.

Thus, FIG. 7 illustrates that at block 706, control is transferred (see transition "1") to the handler code 790 upon detection 704 of an exception, including execution of an instruction that requires a ring transition. The handler code 790 corresponds to the particular exception detected at block 704. For at least one embodiment, the handler code 790 may reside on a different sequencer than the one that invoked the handler.

FIG. 7 illustrates that the processing for the method 780 of providing structured exception handling in the handler code 790 begins at block 712, which is grouped with a portion of handler code instructions referred to herein as the prologue 710 of the handler code 790. At block 712, the handler code 790 begins to perform processing that might otherwise be performed by the OS for some common systems.

At block 712 the handler code 790 saves the state of the OMS. From block 712, processing proceeds to block 714.

At block 714, the handler code 790 performs an operation (EREAD) to determine fault information and also to determine state information for the AMS at the point of the exception. For at least one embodiment, the operation performed at block 714 may be the execution of an architectural instruction (EREAD) that provides for reading the contents of a channel register in order to determine state information for the AMS and also to determine fault information.

The AMS state that is returned as a result of block 714 may be then saved by handler code 790 into a system-defined data structure for use by the exception filter. The handler code 790 may also, at block 714, save other OS-provided metadata about the exception. From block 714, processing proceeds to block 716.

At block 716, the handler code 790 initiates exception handling by first invoking exception dispatcher logic. The exception dispatcher is logic that walks the linked list of exception registration records and decides where to go next. For at least one embodiment of the method 780 illustrated in FIG. 7, the exception dispatch and filtering logic is executed by the AMS at block 717b. As is explained below, the execution of exception dispatch and filtering logic may, alternatively, be executed in part or whole by the OMS at block 717a. Accordingly, the optional nature of dispatch execution 717a by the OMS is indicated in FIG. 7 with broken lines.

For such embodiment, the dispatch logic is thus executed by the AMS at block 717b. The AMS accordingly dispatches the exception to facilitate structured exception handling, much like the exception dispatch routine that the OS would otherwise have called (in many common systems). For at least one embodiment, the dispatch code executed at block 717b matches the semantics of OS-provided dispatch routine, including traversing the registration record list in search of a suitable handler, as well as unwinding the list of registration records once a suitable handler is found, and restoring the context of the AMS that may have been changed in an exception filter routine.

For such embodiment, at block 716 control is transferred to the AMS (see transition "2") by restarting the AMS at the first instruction of the exception dispatcher logic. The AMS then executes the dispatched handler routine (block 708). [Please note that, for such embodiment, optional block 717a is not performed.] After execution of the dispatched handler routine at block 708, the AMS returns control flow to the instruction steam it was executing before the exception was generated (see transition "3" back to block 702).

For at least one alternative embodiment to the processing of block 716 discussed immediately above, it should be understood that the exception dispatch logic, instead of executing on the AMS, may execute in part or whole on the OMS. For such embodiment, the OMS is notified (transition 1) upon taking the exception, but at block 716 the OMS initiates the execution of the exception dispatch logic. At any point before or at the completion of exception handling, the OMS transfers control (see transition "2") back to the AMS. For such embodiment, any remaining dispatch or filter processing 717a occurs on the AMS. Processing then proceeds on the AMS at block 708, as described above.

From block 716, processing proceeds on the OMS to a set of instructions of the handler code 790 referred to herein as the epilogue 720. During the epilogue 720, the handler code 790 restores at block 724 the context that was saved at block 712.

From block 724, processing proceeds to block 726. At block 726, a return function is executed such that the OMS returns to executing whatever code it was executing before the handler code 790 was invoked.

Thus, FIG. 7 illustrates that the exception handler code 790, rather than invoking structured exception handling routines of the OS, may instead directly initiate the exception dispatch process from the handler code 790 itself. In this manner, the exception may be handled completely within the application, bypassing the OS control and part or all of the system-provided routines for managing structured exception handling.

Figure 8:
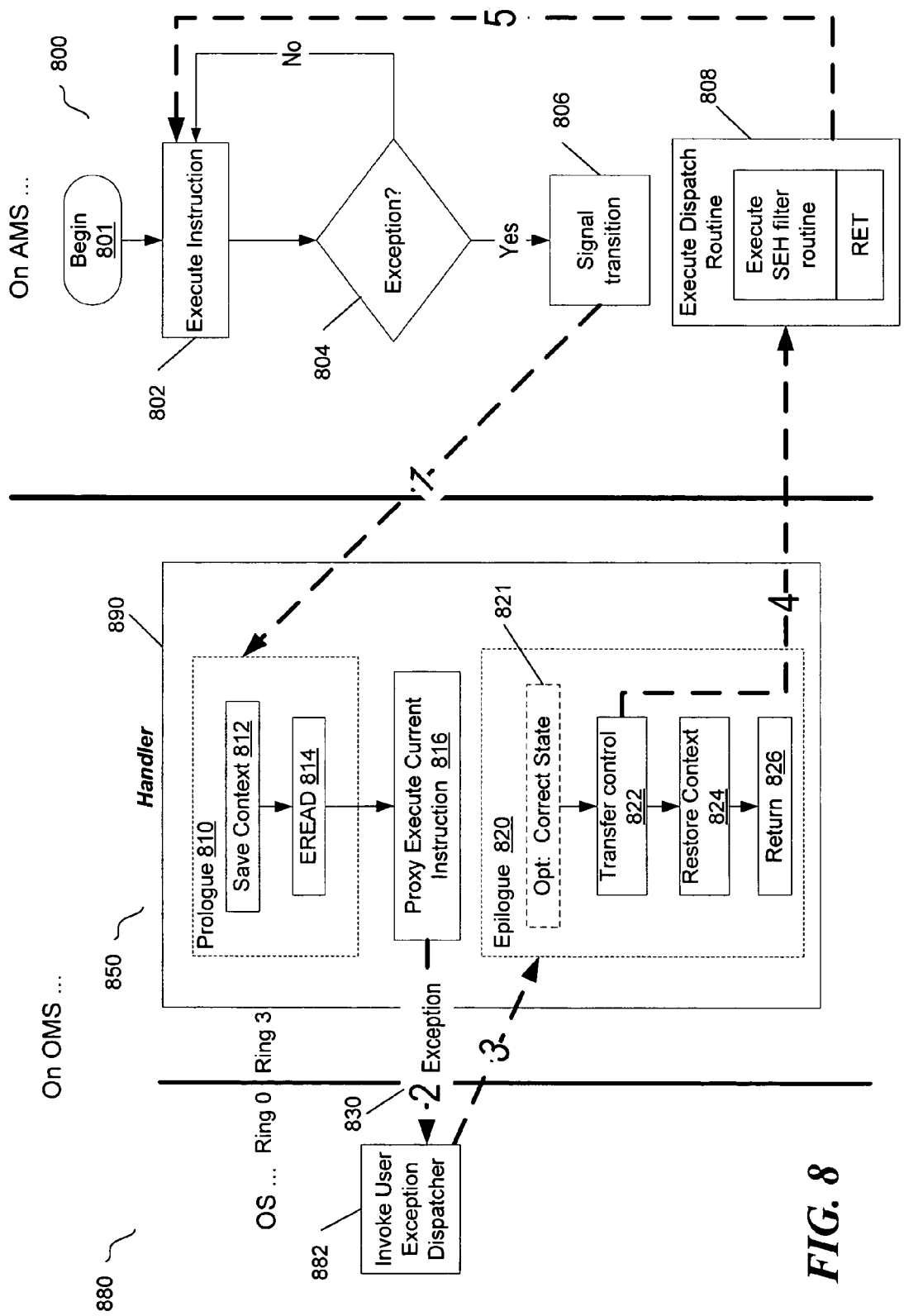
FIG. 8 is a data flow diagram illustrating at least one embodiment of a first method for structured exception handling, in which one thread unit acts as a proxy to invoke system resources for an exception that occurs on a thread unit that is sequestered from the operating system.

FIG. 8 illustrates an alternative embodiment of a mechanism for providing structured exception handling for exceptions that occur on a sequestered application-managed sequencer ("AMS"). For the embodiment illustrated in FIG. 8, a proxy execution mechanism is utilized to leverage an existing OS-provided SEH framework to provide structured exception handling for sequestered AMS sequencers. For at least one embodiment of the methods illustrated in FIG. 8, it is assumed that the OMS and the AMS both employ a mechanism for user-level asynchronous transfer of control between the sequencers.

The method illustrated in FIG. 8 takes advantage of the fact that most of the OS code that facilitates SEH executes almost entirely in user space (shown as "ring 3" in FIG. 8). FIG. 8 illustrates that three methods 800, 850 and 880 may be executed in order to provide structured exception handling for an AMS via an existing OS-supported SEH framework. The method 800 for invoking the structured exception handling upon detection of an exception may be performed by an AMS. Proxy execution 850 may be performed by an OMS, in order to invoke operating system functionality on behalf of the AMS. Finally, the OS of the OMS may perform a method 880 to dispatch the appropriate handler. Each of these methods 800, 850, 880 is discussed in further detail below.

FIG. 8 illustrates that the method 800 for invoking structured exception handling from an AMS begins at block 801 and proceeds to block 802. At block 802, the next instruction of the shred running on an AMS is executed. If the instruction is one that causes an exception, then the exception may be detected at block 804. For at least one embodiment, the type of exception detected at block 804 includes a transition from user privilege level (e.g., ring 3) to a restricted privilege level (e.g., ring 0). As is explained above, the exception may result in a processor state that satisfies a scenario defining the privilege transition, which may in turn trigger an asynchronous transfer of control to handler code 890. If an exception is detected at block 804, then processing proceeds to block 806 where control is asynchronously transferred to the appropriate handler code 890 for the particular detected fault or condition (see transition "1" of FIG. 8). If not, processing returns to block 802, and the method 800 continues until the end of the shred is reached.

The processing for the method 850 of performing proxy execution in the handler code 890 begins at block 812, in a section of the handler code 890 referred to as the prologue 810. For at least one embodiment, the handler code 890 is executed on an OMS in response to an asynchronous user-level transfer of control (see block 806 and transition "1").

In the prologue 810, at blocks 812 and 814, initial processing is performed along the lines of the prologue processing 712 and 714 discussed above in connection with FIG. 7.

Generally, the state for the OMS is saved at block 812 and AMS state information, as well as fault information, is determined at block 814.

From block 814, processing proceeds to block 816. At block 816, the OMS re-executes the instruction that previously generated, when executed at block 802 on the AMS, the exception (see, e.g., execution 802 of instruction and detection of transition 804). This re-execution 816 of the instruction generates an exception 830 that invokes the OS (see transition "2" of FIG. 8). That is, because the exception now occurs on the OMS, which is visible to the OS, the OS in invoked due to the exception 830.

Thus, processing proceeds to block 882, which is the first illustrated block of the method 880 performed by the OS in order to initiate exception dispatch handling for structured exception handling.

At block 882, the OS takes a snapshot of the current state of the OMS and saves the current OMS context into a special data structure (CONTEXT). The OS then calls the system-provided exception dispatch routine. For at least one embodiment, the dispatch routine may reside in a user-space library.

Accordingly, FIG. 8 illustrates that dispatch from the OS (see transition "3") causes a transfer of control to block 822, which is the first illustrated processing block of a set of instructions referred to herein as the "epilogue" 820, which is OMS processing that occurs after it acts as a proxy to invoke the OS exception-handing processing. The execution of the instructions of the epilogue 820 may constitute additional processing of the method 850 performed by the OMS.

Because the OMS is not the sequencer that actually executes the dispatched handler code, the OMS effects a control transfer to the AMS (see transfer "4") at block 822. For at least one embodiment, this transition is performed as a result of execution of a user-level, synchronous, architecturally-defined (e.g., part of the ISA) control transfer instruction, such as a shred transfer ("SXFR") instruction. For at least one embodiment, the OMS, at block 822, returns the current OMS context to the AMS before it performs the control transfer.

OMS processing then proceeds to block 824, where the handler code 890 restores the OMS context that was saved at block 812.

From block 824, processing proceeds to block 826. At block 826, a return function is executed such that the OMS returns to executing whatever code it was executing before the handler code was invoked.

FIG. 8 illustrates that the AMS begins executing the dispatch logic at block 808, in response to the control transfer (see transition "4") effected by the OMS at block 822. The AMS can now process the exception through the system's normal control flow, since almost all of the exception processing logic executes at user-level (Ring 3). At the end of the dispatched handler code, control returns (see transition "5") to the next instruction in the instruction stream that the AMS was executing before the exception occurred.

FIG. 8 illustrates an optional block of processing, block 821, in the epilogue 820. Because the operating system is allowed to change the segment register values on the OMS, it is possible for these values saved in the CONTEXT data structure (generated by the OS and passed to the exception filter) to become inconsistent with the original AMS's segment register values. For correctness, then, the OMS may optionally correct the value of the segment registers contained in the CONTEXT data structure that was saved due to taking the exception on the OMS (see 830). FIG. 8 illustrates that this optional correction of the segment register values may be performed at block 821, on return from the OS after incurring the exception. For embodiments that do not perform this optional step processing, AMS processing is not negatively impacted because the AMS maintains the correct segment register values.

Thus, FIG. 8 illustrates that the exception handler code 890, acts as a proxy to invoke the structured exception handling routines of the OS on behalf of an AMS that is not visible to the OS. In this manner, the AMS may execute code that may require system resources, despite the AMS being invisible to the operating system. One skilled in the art will recognize that part or all of the exception dispatch and filtering logic 808 may be executed on the OMS rather than on the AMS, before control is returned to the AMS at block 822.

Figure 9:
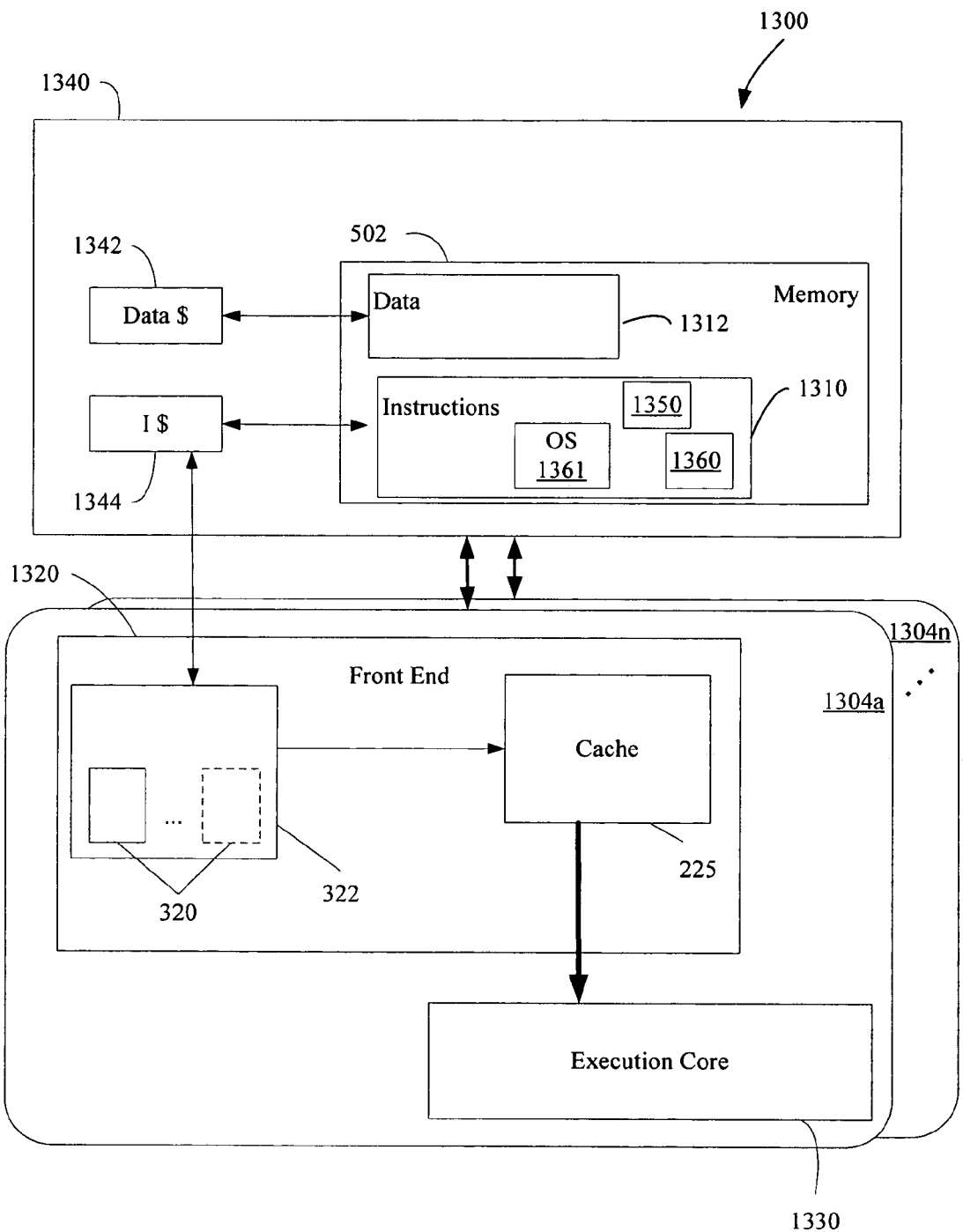
FIG. 9 is a block diagram illustrating at least one embodiment of a system capable of performing disclosed techniques.

FIG. 9 Illustrates at least one sample embodiment of a computing system 1300 capable of performing disclosed techniques. The computing system 1300 includes n processor cores 1304a-1304n and a memory system 1340. Memory system 1340 may include larger, relatively slower memory storage 502, as well as one or more smaller, relatively fast caches, such as an instruction cache 1344 and/or a data cache 1342. Although not individually shown, each core 1304a-1304n may have its own instruction cache 1344 and/or data cache 1342.

Memory system 1340 is intended as a generalized representation of memory and may include a variety of forms of memory, such as a hard drive, CD-ROM, random access memory (RAM), dynamic random access memory (DRAM), static random access memory (SRAM), flash memory and related circuitry. Memory system 1340 may store instructions 1310 and/or data 1312 represented by data signals that may be executed by processor 1304. The instructions 1310 and/or data 1312 may include code and/or data for performing any or all of the techniques discussed herein.

Instructions 1310 may include main thread code 1350. Main thread code 1350 may include instructions to initialize one or more OS-invisible shreds. The initialization instructions of main thread code 1350 may, when executed by a sequencer, cause an OS-invisible sequencer to execute a shred instruction stream while sharing the logical execution environment of the main (native) thread.

Instructions may also include operating system (OS) code 1361. In addition, for at least one embodiment instructions 1310 may also include a one or more handler routines 1360 to cause one sequencer (not sequestered) to dispatch registered filter routines to be executed by a sequestered sequencer. The handler routine 1360 may include instructions to perform at least one of the methods 780, 850 illustrated in FIGS. 7 and 8, respectively, to support structured exception handling for sequestered sequencers.

For at least one embodiment, instructions 1310 may include one or more instructions to signal a privilege transition as discussed above in connection with blocks 704 and 706 of FIG. 7 and with blocks 804 and 806 of FIG. 8. That is, the instructions 1310 may include ISA instructions to trigger an asynchronous transfer of control to handler code in response to a privilege transition or other exception.

The processors 1304a-1304n need not be symmetrical, but each may include a front end 1320 that supplies instruction information to an execution core 1330. Fetched instruction information may be buffered in a cache 225 to await execution by the execution core 1330. The front end 1320 may supply the instruction information to the execution core 1330 in program order. For at least one embodiment, the front end 1320 includes a fetch/decode unit 322 that determines the next instruction to be executed. For at least one embodiment of the system 1300, the fetch/decode unit 322 may include a single next-instruction-pointer and fetch logic 320. However, in an embodiment where each processor 1304a-1304n supports multiple thread contexts, the fetch/decode unit 322 implements distinct next-instruction-pointer and fetch logic 320 for each supported thread context. The optional nature of additional next-instruction-pointer and fetch logic 320 in a multiprocessor environment is denoted by dotted lines in FIG. 13.

Embodiments of the methods described herein may be implemented in hardware, hardware emulation software or other software, firmware, or a combination of such implementation approaches. Embodiments of the invention may be implemented for a programmable system comprising at least one processor, a data storage system (including volatile and non-volatile memory and/or storage elements), at least one input device, and at least one output device. For purposes of this application, a processing system includes any system that has a processor, such as, for example; a digital signal processor (DSP), a microcontroller, an application specific integrated circuit (ASIC), or a microprocessor.

A program may be stored on a storage media or device (e.g., hard disk drive, floppy disk drive, read only memory (ROM), CD-ROM device, flash memory device, digital versatile disk (DVD), or other storage device) readable by a general or special purpose programmable processing system. The instructions, accessible to a processor in a processing system, provide for configuring and operating the processing system when the storage media or device is read by the processing system to perform the procedures described herein. Embodiments of the invention may also be considered to be implemented as a tangible machine-readable storage medium, configured for use with a processing system, where the storage medium so configured causes the processing system to operate in a specific and predefined manner to perform the functions described herein.

Sample system 1300 is representative of processing systems based on the Pentium®, Pentium® Pro, Pentium® II, Pentium® III, Pentium® 4, and Itanium® and Itanium® 2 microprocessors available from Intel Corporation, although other systems (including personal computers (PCs) having other microprocessors, engineering workstations, personal digital assistants and other hand-held devices, set-top boxes and the like) may also be used. For one embodiment, sample system may execute a version of the Windows™ operating system available from Microsoft Corporation, although other operating systems and graphical user interfaces, for example, may also be used.

While particular embodiments of the present invention have been shown and described, it will be obvious to those skilled in the art that changes and modifications can be made without departing from the scope of the appended claims. For example, although registers 440 and 443 have been discussed above as the means for storing pointers or indices related to shred environment blocks, its should be understood by one of skill in the art that any storage means, including a latch, memory location, or other storage mechanism may be utilized instead of a register.

Accordingly, one of skill in the art will recognize that changes and modifications can be made without departing from the present invention in its broader aspects. Thus, one of skill in the art will recognize that features of the embodiments described herein may be applied to other environments without departing from the scope of the claims appended below. The appended claims are to encompass within their scope all such changes and modifications that fall within the true scope of the present invention.

What is claimed is:

1. A method, comprising:
executing, on a first thread unit, an instruction that causes a user level exception, wherein the first thread unit is an application managed sequencer that is sequestered from an operating system;
in response to said user level exception, triggering a transfer of control to a second thread unit, wherein the second thread unit is an operating system managed sequencer that is not sequestered from the operating system;
saving, prior to said transfer of control, a first state of the second thread unit;
re-executing said instruction on said second thread unit, so as to cause said user level exception on said second thread unit;
executing a first portion of user level exception handler code on the second thread unit in response to said user level exception on the second thread unit, wherein the user level exception handler code includes dispatch processing code;
returning, after executing the first portion of user level exception handler code on the second thread unit, a current state of the second thread unit to the first thread unit;
returning control to the first thread unit;
executing at least a portion of said dispatch processing code and a second portion of the user level exception handler code on said first thread unit; and
restoring, after executing the first portion of the user level exception handler code, the second thread unit to the first state.

2. The method of claim 1, wherein:
said user level exception is a privilege level transition.

3. The method of claim 1, wherein said triggering a transfer of control further comprises:
executing an architectural instruction to perform an asynchronous transfer of control to the second thread unit.

4. The method of claim 1, wherein said dispatch processing code comprises instructions for:
selecting a handler routine by traversing a registration record list, wherein the registration record list includes one or more handler routines.

5. A method comprising:
executing on a first thread unit, which is managed by a user application rather than an operating system, an instruction that results in a user level exception;
passing control to a second thread unit managed by the operating system, responsive to the occurrence of said user level exception;
re-executing the instruction on the second thread unit to cause the occurrence of the user level exception on the second thread unit;
in response to the user level exception on the second thread unit, executing a first portion of a user level exception handler routine on the second thread unit, the user level exception handler routine including a dispatch processing routine;
returning control to the first thread unit after executing said first portion of said user level exception handler code on the second thread unit; and
executing a second portion of said user level exception handler routine and at least a portion of said dispatch processing routine with said first thread unit.

6. The method of claim 5, wherein executing the at least a portion of said dispatch processing routine occurs without invoking the operating system.

7. The method of claim 6, wherein executing said dispatch processing routine comprises:
traversing a linked list of registered exception filters.

8. The method of claim 7, wherein:
said linked list of registered exception filters is pointed to by a shred environment block that is not managed by the operating system.

9. The method of claim 6, wherein:
execution of said dispatch processing routine is performed by the first thread unit.

10. The method of claim 5, further comprising:
saving a first context state of the second thread unit prior to said transfer of control to said second thread unit.

11. The method of claim 10, further comprising:
restoring said first context state after control is returned to said first thread unit.

12. An article comprising a non-transitory, tangible machine-accessible medium having a plurality of machine accessible instructions, wherein, when the instructions are executed by a processor, the instructions cause the processor to:
execute, on a first thread unit, an instruction which causes user level exception, wherein the first thread unit is managed by a user application rather than an operating system;
passing control to a second thread unit managed by the operating system in response to said user level exception;
re-executing said instruction on the second thread unit to cause the occurrence of the user level exception on the second thread unit;
execute, in response to the user level exception on the second thread unit, a first portion of a user level exception handler routine on the second thread unit, the user level exception handler routine including a dispatch processing routine;
return control to the first thread unit after executing said first portion of said user level exception handler routine; and
execute a second portion of said user level exception handler routine and at least a portion of said dispatch processing routine with said first thread unit.

13. The article of claim 12, wherein said instructions when executed by a processor further cause the processor to:
execute an architectural instruction to perform an asynchronous transfer of control to the second thread unit.

14. The article of claim 12, wherein said instructions are part of the operating system.

15. An article comprising a non-transitory, tangible machine-accessible medium having a plurality of machine accessible instructions, wherein, when the instructions are executed by a processor, the instructions cause the processor to perform the following operations comprising:
execute on a first thread unit an instruction that results in a user level exception, wherein the first thread unit is an application managed sequencer that is sequestered from an operating system;
in response to the occurrence of said user level exception, trigger a transfer of control to a second thread unit, wherein the second thread unit is an operating system managed sequencer that is not managed by the operating system;
save, prior to said transfer of control, a first state of the second thread unit;
re-execute said instruction on said second thread unit, so as to cause said user level exception on the second thread unit;

execute a first portion of user level exception handler code on the second thread unit in response to said user level exception on the second thread unit, wherein the user level exception handler code includes dispatch processing code;

return, after execution of the first portion of said user level exception handler code on the second thread unit, a current state of the second thread unit to the first thread unit;

return control to the first thread unit;

execute at least a portion of said dispatch processing code and a second portion of the user level exception handler code on the first thread unit; and restore, after executing the first portion of the user level exception handler code, the second thread unit to the first state.

16. The article of claim 15, wherein said machine accessible instructions are not part of the operating system but are instead part of user-level code.

17. The article of claim 15, wherein said instructions when executed by the processor further cause the processor, when executing the at least a portion of the dispatch processing code, to traverse a linked list of registered exception filters.

18. The article of claim 17, wherein said linked list of registered exception filters is pointed to a shred environment block that is not managed by the operating system.

19. The article of claim 17, wherein:

executing the at least a portion of said dispatch processing routine is performed by the first thread unit.

20. The article of claim 15, wherein said instructions when executed by the processor further cause the processor to:

save a first context state of the second thread unit prior to passing control from said first thread unit to said second thread unit.

21. The article of claim 20, wherein said instructions when executed by the processor further cause the processor to:

restore said first context state after control is returned to said first thread unit.

22. A system comprising:

a memory system configured to store an operating system (OS); and a first thread unit not managed by the OS and a second thread unit managed by the OS, the first thread unit to execute an OS-transparent user-level thread associated with a native thread created by the OS;

each of the first and second thread units having an instruction set architecture that includes an instruction to trigger an asynchronous transfer of control to user level exception handler code in response to a user level exception;

the memory further configured to include the user level exception handler code, wherein the user level exception handler code includes instructions that when executed cause the system to perform the following operations in response to the user level exception comprising:

trigger, in response to the execution of an instruction causing a user level exception on said first thread unit, a transfer of control from the first thread unit to the second thread unit;

save, prior to said transfer of control, a first state of the second thread unit;

re-execute said instruction on said second thread unit so as to cause said user level exception on the second thread unit;

execute a first portion of said user level exception handler code on the second thread unit in response to said user level exception on the second thread unit, wherein the user level exception handler code includes dispatch processing code;

return, after execution of the first portion of said user level exception handler code on the second thread unit, a current state of the second thread unit to the first thread unit;

return control to the first thread unit;

execute at least a portion of said dispatch processing code and a second portion of said user level exception handler code on the first thread unit; and restore, after executing the first portion of the user level exception handler code, the second thread unit to the first state.

23. The system of claim 22, wherein:

said memory further comprises a storage area configured to maintain local data for the user-level thread.

24. The system of claim 22, wherein said system memory further comprises:

a Dynamic Random Access Memory (DRAM).

25. The system of claim 22, wherein:

said operating system includes a structured exception handling service; and said user level exception handler code further includes one or more instructions to invoke the operating system's structured exception handling service on behalf of the first thread unit.

26. The system of claim 22, wherein:

the instruction set architecture of the second thread unit includes an instruction to allow the second thread unit to read context information and exception information about the user level exception from the first thread unit.

27. The system of claim 22, wherein:

the instruction set architecture of the first and second thread units include one or more instructions to allow the second thread unit to cause a synchronous control transfer to the first thread unit.

28. The system of claim 22, wherein the user level exception handler code includes instructions that when executed cause the second thread unit to invoke said dispatch processing code for execution by the first thread unit, wherein the dispatch processing code comprises instructions which when executed cause the system to dispatch a registered filter routine for execution by the second thread unit.

* * * * *